United States Patent
Ito et al.

(10) Patent No.: US 11,520,538 B2
(45) Date of Patent: Dec. 6, 2022

(54) IMAGE FORMING APPARATUS

(71) Applicant: CANON KABUSHIKI KAISHA, Tokyo (JP)

(72) Inventors: Ryusuke Ito, Ibaraki (JP); Shinnosuke Iwadate, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/361,871

(22) Filed: Jun. 29, 2021

(65) Prior Publication Data

US 2022/0004347 A1 Jan. 6, 2022

(30) Foreign Application Priority Data

Jul. 3, 2020 (JP) .............................. JP2020-115788

(51) Int. Cl.
*G06F 3/12* (2006.01)

(52) U.S. Cl.
CPC ............ *G06F 3/1208* (2013.01); *G06F 3/126* (2013.01); *G06F 3/1253* (2013.01)

(58) Field of Classification Search
CPC ...... G06F 3/1208; G06F 3/1253; G06F 3/126; G06F 3/1258; G06F 3/1282
See application file for complete search history.

(56) References Cited

U.S. PATENT DOCUMENTS

| | | | |
|---|---|---|---|
| 7,760,370 B2 | 7/2010 | Oki | |
| 2006/0215212 A1* | 9/2006 | Tao | H04N 1/00063 358/1.14 |
| 2007/0053710 A1* | 3/2007 | Shibaki | G03G 15/50 399/81 |
| 2016/0191720 A1* | 6/2016 | Yamaguchi | B41J 11/663 358/1.12 |

OTHER PUBLICATIONS

Shinnosuke Iwadate et al., U.S. Appl. No. 17/361,894, filed Jun. 29, 2021.

* cited by examiner

*Primary Examiner* — Iriana Cruz
(74) *Attorney, Agent, or Firm* — Venable LLP (57) ABSTRACT

An image forming apparatus includes a printing apparatus and controls, when an interrupt print job to be processed by interrupting image formation based on a print job is requested, the printing apparatus to form an image corresponding to the interrupt print job by interrupting processing based on the print job. The printing apparatus is controlled to create a first predetermined number of charts for adjustment obtained by forming the image for adjustment on the sheet before the processing is returned to the print job after end of processing based on the interrupt print job, and adjust the image forming condition based on a result of reading the image for adjustment of the first predetermined number of charts for adjustment by the image sensor before the processing is returned to the print job.

15 Claims, 8 Drawing Sheets

```
┌─────────────────────────────┐
│          JOB ID             │
├─────────────────────────────┤
│    SHEET FEEDING DECK ID    │
├─────────────────────────────┤
│    NUMBER OF SHEETS OF      │
│    ADJUSTMENT INTERVAL      │
├─────────────────────────────┤
│      FRONT-AND-BACK         │
│    AUTO ADJUSTMENT FLAG     │
├─────────────────────────────┤
│     INTERRUPT PRINT FLAG    │
├─────────────────────────────┤
│       PREVIOUS JOB ID       │
├─────────────────────────────┤
│             ...             │
└─────────────────────────────┘
```

FIG. 6

```
801
  ┌─────────────────────────────────┐  ┐
  │   FIRST SHEET FEEDING DECK ID   │  │
802├─────────────────────────────────┤  │
  │  FRONT-AND-BACK REGISTRATION    │  │
803│  MAIN SCANNING OFFSET VALUE     │  │  FRONT-AND-BACK AUTO
  ├─────────────────────────────────┤  ├  ADJUSTMENT INFORMATION
  │  FRONT-AND-BACK REGISTRATION    │  │  ON FIRST SHEET FEEDING DECK
  │  SUB-SCANNING OFFSET VALUE      │  │
  ├─────────────────────────────────┤  │
804│              ...                │  │
  ├─────────────────────────────────┤  ┘
  │   SECOND SHEET FEEDING DECK ID  │  ┐
805├─────────────────────────────────┤  │
  │  FRONT-AND-BACK REGISTRATION    │  │
806│  MAIN SCANNING OFFSET VALUE     │  │  FRONT-AND-BACK AUTO
  ├─────────────────────────────────┤  ├  ADJUSTMENT INFORMATION
  │  FRONT-AND-BACK REGISTRATION    │  │  ON SECOND SHEET FEEDING DECK
  │  SUB-SCANNING OFFSET VALUE      │  │
  ├─────────────────────────────────┤  │
  │              ...                │  │
  ├─────────────────────────────────┤  ┘
  │              ...                │
  ├─────────────────────────────────┤
  │   n-TH SHEET FEEDING DECK ID    │
  ├─────────────────────────────────┤
  │  FRONT-AND-BACK REGISTRATION    │
  │  MAIN SCANNING OFFSET VALUE     │
  ├─────────────────────────────────┤
  │  FRONT-AND-BACK REGISTRATION    │
  │  SUB-SCANNING OFFSET VALUE      │
  ├─────────────────────────────────┤
  │              ...                │
  └─────────────────────────────────┘
```

IMAGE FORMING APPARATUS

BACKGROUND OF THE INVENTION

Field of the Invention

The present disclosure relates to an image forming apparatus, for example, a printer, a copying machine, a facsimile machine, or a multifunction apparatus.

Description of the Related Art

Printed products generated by commercial printing machines require stabilized image quality. Therefore, an image forming apparatus performs automatic adjustment for automatically stabilizing the image quality of the printed product. As an example of the automatic adjustment, there is known automatic adjustment for automatically stabilizing geometric characteristics of an image to be formed on a sheet. Through this automatic adjustment, for example, correction values for correcting the geometric characteristics of the image to be formed on the sheet to the ideal geometric characteristics are generated correspondingly for each sheet feeding deck. At a time of printing, the geometric characteristics of the image are controlled based on the correction values corresponding to the sheet feeding deck from which the sheet has been fed.

In U.S. Pat. No. 7,760,370 B2, there is disclosed an image forming apparatus configured to stabilize the geometric characteristics of an image to be formed on a sheet. In order to stabilize the geometric characteristics, this image forming apparatus creates a chart for adjustment by printing an image for adjustment on the sheet. The chart for adjustment has the image for adjustment read by an image reading sensor provided in a conveyance path for the sheet. The image forming apparatus detects the geometric characteristics of the image to be formed on the sheet based on a reading result of the image for adjustment. The image forming apparatus adjusts, for example, a print position and an inclination of the image in order to correct the detected geometric characteristics to the ideal geometric characteristics.

The chart for adjustment is created every time printing is performed on a predetermined number of sheets based on a job. Image forming conditions (in the above-mentioned example, the correction values for the geometric characteristics of the image to be formed on the sheet) are obtained based on the reading result of this chart for adjustment. The automatic adjustment can be set enabled or disabled by a user. When the automatic adjustment is set disabled, the automatic adjustment is not to be executed during printing corresponding to the job. Therefore, the image forming conditions are not updated.

The automatic adjustment can be set enabled or disabled for each job. For example, an interrupt print job having the automatic adjustment set disabled may be instructed while printing is being performed based on a print job having the automatic adjustment set enabled. In this case, the image forming conditions are not updated during execution of the interrupt print job. Therefore, when the interrupted print job is restarted after an end of the interrupt print job, the image forming conditions remain the same as old image forming conditions before the execution of the interrupt print job, to thereby cause image quality at a time of the restart after the interrupt print job to differ from image quality before the interrupt print job. Thus, there is a fear that, for example, a density of an image before the interrupt print job may differ from a density of the image after the interrupt print job. In another case, there is a fear that, for example, the geometric characteristics of the image to be formed on the sheet may not be controlled to the ideal geometric characteristics. In particular, there is a fear that, in double-sided printing, printing positions on the front and back sides may be deviated. The present disclosure has an object to stabilize quality of an image to be formed on a sheet even when an interrupt print job is executed.

SUMMARY OF THE INVENTION

An image forming apparatus according to the present disclosure includes: a printing apparatus configured to form an image on a sheet based on an image forming condition; an image reading unit configured to read an image for adjustment of the image forming condition, which is formed on the sheet by the printing apparatus; and at least one processor configured to: control the printing apparatus to form an image based on a print job; and control, when an interrupt print job to be processed by interrupting image formation based on the print job is requested, the printing apparatus to form an image corresponding to the interrupt print job by interrupting processing based on the print job, wherein the at least one processor is configured to: control the printing apparatus to create a chart for adjustment obtained by forming the image for adjustment on the sheet before the processing is returned to the print job after end of processing based on the interrupt print job; and adjust the image forming condition based on a result of reading the image for adjustment of the chart for adjustment by the image reading unit.

Further features of the present invention will become apparent from the following description of exemplary embodiments (with reference to the attached drawings).

DESCRIPTION OF THE EMBODIMENTS

Now, an embodiment of the present disclosure is described in detail with reference to the accompanying drawings.

<Image Processing System>

Figure 1:
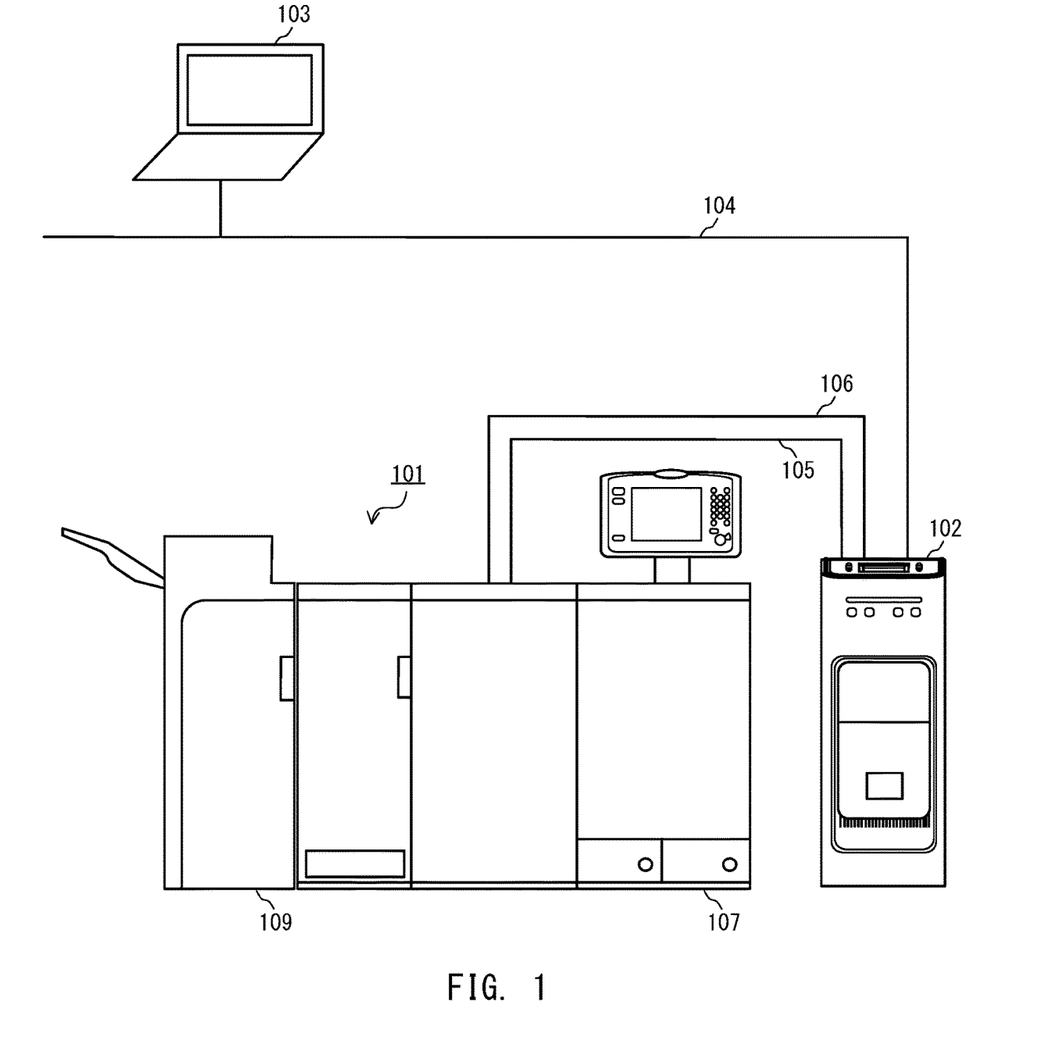
FIG. 1 is a configuration diagram of an image processing system.

FIG. 1 is a configuration diagram of an image processing system including an image forming apparatus according to this embodiment. The image processing system includes an image forming apparatus 101 and an external controller 102. Examples of the image forming apparatus 101 include a multifunction apparatus and a multifunction peripheral (MFP). Examples of the external controller 102 include an image processing controller, a digital front end (DFE), and a print server.

The image forming apparatus 101 and the external controller 102 are connected to each other so as to enable communication therebetween through an internal local area network (LAN) 105 and a video cable 106. The external controller 102 is connected to a client personal computer (PC) 103 through an external LAN 104. The external controller 102 is configured to obtain a print instruction (print job) from the client PC 103.

A printer driver having a function of converting image data into a Page Description Language that can be processed by the external controller 102 is installed on the client PC 103. A user can instruct printing through the printer driver by various applications. The printer driver transmits image data to the external controller 102 based on a print job instructed from the user. The external controller 102 receives the print job including the image data from the client PC 103, performs data analysis and rasterization processing on the image data, and instructs the image forming apparatus 101 to print (to perform image formation) based on the image data.

The image forming apparatus 101 is configured by connecting a plurality of apparatus having different functions including a printing apparatus 107 to one another, and can perform complicated printing processing including bookbinding. The image forming apparatus 101 according to this embodiment includes the printing apparatus 107 and a finisher 109. The printing apparatus 107 is configured to form an image on a sheet fed from a sheet feeding unit provided at a lower part of a main body, through use of a developer (for example, toner). The printing apparatus 107 forms yellow (Y), magenta (M), cyan (C), and black (K) images. A full-color image in which the images in the respective colors are superimposed on one another is formed on the sheet. The sheet having the image formed thereon is conveyed from the printing apparatus 107 to the finisher 109. The finisher 109 stacks such sheets (printed products) having images formed thereon.

This image processing system is configured by connecting the external controller 102 to the image forming apparatus 101, but the image forming apparatus 101 and the external controller 102 may be integrally configured. For example, the image forming apparatus 101 may be configured to obtain the print job including the image data directly from the client PC 103 through the external LAN 104. In this case, the image forming apparatus 101 is configured to perform the data analysis and rasterization processing that are supposed to be performed by the external controller 102.

<System Configuration>

Figure 2:
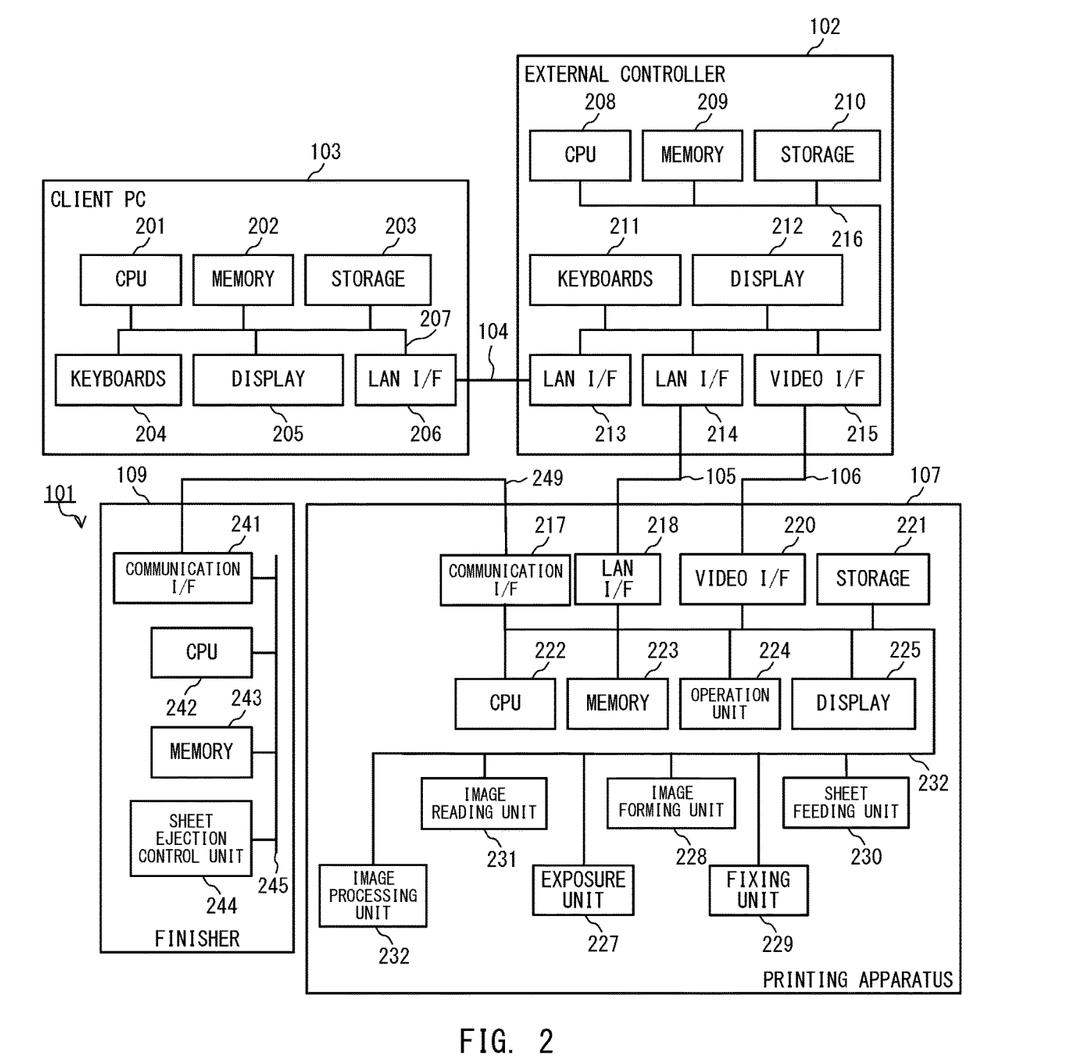
FIG. 2 is a system configuration diagram.

FIG. 2 is a system configuration diagram for illustrating how to control an operation of the image processing system. In this case, a controller configured to control an operation of each of the image forming apparatus 101, the external controller 102, and the client PC 103 is described.

Printing Apparatus

The printing apparatus 107 includes a communication interface (I/F) 217, a LAN I/F 218, and a video I/F 220 in order to communicate to/from other apparatus. The printing apparatus 107 includes a central processing unit (CPU) 222, a memory 223, a storage 221, an image reading unit 231, and an image processing unit 232 in order to control an operation of the printing apparatus 107. The printing apparatus 107 includes an exposure unit 227, an image forming unit 228, a fixing unit 229, and a sheet feeding unit 230 in order to form an image. The printing apparatus 107 includes an operation unit 224 and a display 225 as user interfaces. Those components are connected to one another through a system bus 233 so as to enable communication to/from one another.

The communication I/F 217 is connected to the finisher 109 through a communication cable 249, and is configured to control communication to/from the finisher 109. When the printing apparatus 107 and the finisher 109 operate in cooperation with each other, information and data are transmitted and received through intermediation of the communication I/F 217. The LAN I/F 218 is connected to the external controller 102 through the internal LAN 105, and is configured to control communication to/from the external controller 102. The printing apparatus 107 receives a print setting from the external controller 102 through intermediation of the LAN I/F 218. The video I/F 220 is connected to the external controller 102 through the video cable 106, and is configured to control communication to/from the external controller 102. The printing apparatus 107 receives image data representing an image to be formed from the external controller 102 through intermediation of the video I/F 220.

The CPU 222 is configured to execute computer programs stored in the storage 221 to comprehensively perform image processing and printing control. The memory 223 is configured to provide a work area for the CPU 222 to execute various kinds of processing. In a case of performing image forming processing, the CPU 222 controls the exposure unit 227, the image forming unit 228, the fixing unit 229, and the sheet feeding unit 230.

The exposure unit 227 includes a photoconductor, a charging wire configured to charge the photoconductor, and a light source configured to expose the photoconductor charged by the charging wire to light in order to form an electrostatic latent image on the photoconductor. The photoconductor is, for example, a photosensitive belt having a photosensitive layer formed on a surface of a belt-like elastic member or a photosensitive drum having a photosensitive layer formed on a surface of a cylinder. In place of the charging wire, a charging roller may be used. The exposure unit 227 is configured to charge a surface of the photoconductor to a uniform negative potential through use of the charging wire. The exposure unit 227 is also configured to output laser light based on the image data from the light source. The laser light is scanned across the surface of the photoconductor that has been uniformly charged. Thus, a potential of the photoconductor changes at a position irradiated with the laser light, and an electrostatic latent image is formed on the surface of the photoconductor. Four photoconductors are provided in correspondence with the four colors of yellow (Y), magenta (M), cyan (C), and black (K). Electrostatic latent images corresponding to images in mutually different colors are formed on the four photoconductors.

The image forming unit 228 is configured to transfer a toner image formed on the photoconductor to the sheet. The image forming unit 228 includes a developing device, a transfer unit, and a toner replenisher. The developing device is configured to form a toner image by causing toner charged to a negative polarity to adhere from a developing cylinder to an electrostatic latent image formed on the surface of the photoconductor. Four developing devices are provided in correspondence with the four colors of yellow (Y), magenta (M), cyan (C), and black (K). The developing device visualizes the electrostatic latent image on the photoconductor through use of the toner of the corresponding color.

The transfer unit includes an intermediate transfer belt, and is configured to transfer the toner image from the photoconductor onto the intermediate transfer belt. A primary transfer roller is provided at a position opposed to each photoconductor across the intermediate transfer belt. When a positive potential is applied to each primary transfer roller, the toner images are transferred from the four photoconductors onto the intermediate transfer belt while being superimposed on one another. Thus, a full-color toner image is formed on the intermediate transfer belt. The toner image formed on the intermediate transfer belt is transferred onto the sheet by a secondary transfer roller described later. The secondary transfer roller is configured to transfer the full-color toner image from the intermediate transfer belt onto the sheet when a positive potential is applied to the secondary transfer roller.

The fixing unit 229 is configured to fix the transferred toner image to the sheet. The fixing unit 229 includes a heater and a roller pair. The fixing unit 229 heats and pressurizes the toner image on the sheet by the heater and the roller pair to melt the toner image and fix the toner image to the sheet. Thus, the image is formed on the sheet. The sheet feeding unit 230 includes a conveyance roller and various sensors in a conveyance path, and is configured to control a sheet feeding operation.

The image reading unit 231 is configured to read the image formed on the conveyed sheet based on an instruction received from the CPU 222. For example, in a case of adjusting image forming conditions, the CPU 222 causes the image reading unit 231 to read images for adjustment of the image forming conditions, which are formed on the sheet. The operation unit 224 is an input device configured to receive input of various settings and operation instructions from the user. Examples of the operation unit 224 include various input keys and a touch panel. The display 225 is an output device configured to display setting information on the image forming apparatus 101 and a processing status (status information) of the print job.

Finisher

The finisher 109 is configured to execute post-processing including staple processing on, for example, printed products output from the printing apparatus 107. The finisher 109 includes a communication I/F 241, a CPU 242, a memory 243, and a sheet ejection control unit 244. Those components are connected to one another through a system bus 245 so as to enable communication to/from one another. The communication I/F 241 is connected to the printing apparatus 107 through the communication cable 249, and is configured to control communication to/from the printing apparatus 107. When the finisher 109 and the printing apparatus 107 operate in cooperation with each other, information and data are transmitted and received through intermediation of the communication I/F 241. The CPU 242 is configured to execute control programs stored in the memory 243 to perform post-processing and various kinds of control required for sheet discharge. The memory 243 is configured to store the control programs. The memory 243 is also configured to provide a work area for the CPU 242 to execute various kinds of processing. The sheet ejection control unit 244 is configured to deliver the conveyed sheet based on an instruction received from the CPU 242.

External Controller

The external controller 102 includes a LAN I/F 213, a LAN I/F 214, and a video I/F 215 in order to communicate to/from other apparatus. The external controller 102 includes a CPU 208, a memory 209, and a storage 210 in order to control the operation of the external controller 102. The external controller 102 includes a keyboard 211 and a display 212 as user interfaces. Those components are connected to one another through a system bus 216 so as to enable communication to/from one another.

The LAN I/F 213 is connected to the client PC 103 through the external LAN 104, and is configured to control communication to/from the client PC 103. The external controller 102 obtains the print job from the client PC 103 through intermediation of the LAN I/F 213. The LAN I/F 214 is connected to the printing apparatus 107 through the internal LAN 105, and is configured to control communication to/from the printing apparatus 107. The external controller 102 transmits the print setting to the printing apparatus 107 through intermediation of the LAN I/F 214. The video I/F 215 is connected to the printing apparatus 107 through the video cable 106, and is configured to control communication to/from the printing apparatus 107. The external controller 102 transmits the image data to the printing apparatus 107 through intermediation of the video I/F 215.

The CPU 208 is configured to execute computer programs stored in the storage 210 to comprehensively perform processing including reception of the image data transmitted from the client PC 103, RIP processing, and transmission of the image data to the image forming apparatus 101. The memory 209 is configured to provide a work area for the CPU 208 to execute various kinds of processing. The keyboard 211 is an input device configured to receive input of various settings and operation instructions from the user. The display 212 is an output device configured to display information on an execution application of the external controller 102 as a still image or a moving image.

Client PC

The client PC 103 includes a CPU 201, a memory 202, a storage 203, a keyboard 204, a display 205, and a LAN I/F 206. Those components are connected to one another through a system bus 207 so as to enable communication to/from one another.

The CPU 201 is configured to execute computer programs stored in the storage 203 to control the operation of the client PC 103. In this embodiment, the CPU 201 creates image data and transmits a print job. The memory 202 is configured to provide a work area for the CPU 201 to execute various kinds of processing. The keyboard 204 and the display 205 are user interfaces. The keyboard 204 is an input device configured to receive instructions from the user. The display 205 is an output device configured to display information on an execution application of the client PC 103 as a still image or a moving image. The LAN I/F 206 is connected to the external controller 102 through the external LAN 104, and is configured to control communication to/from the external controller 102. The client PC 103 is configured to transmit the print job including the image data to the external controller 102 through the LAN I/F 206.

The external controller 102 and the image forming apparatus 101 are connected through the internal LAN 105 and the video cable 106, but may be connected, for example, only through a video cable as long as data required for printing can be transmitted and received therebetween. It suffices that each of the memory 202, the memory 209, the memory 223, and the memory 243 is a storage device for holding data and programs. As those memories, it is possible to use, for example, a volatile random access memory (RAM), a non-volatile read only memory (ROM), a storage, and a universal serial bus (USB) memory.

<Configuration of Image Forming Apparatus>

Figure 3:
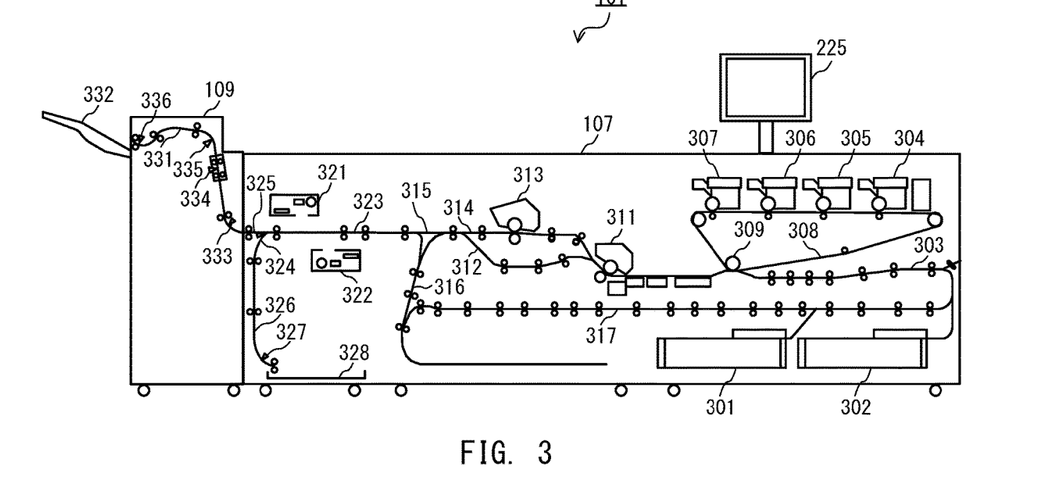
FIG. 3 is a configuration diagram of an image forming apparatus.

FIG. 3 is a configuration diagram of the image forming apparatus 101. The display 225 is provided at an upper part of the printing apparatus 107. The display 225 is configured to display information for a printing status and settings of the image forming apparatus 101. The sheet (printed product) having the image formed thereon by the printing apparatus 107 is conveyed to the finisher 109 provided in the subsequent stage.

The printing apparatus 107 includes a plurality of sheet feeding decks 301 and 302 and a conveyance path 303 as the sheet feeding unit 230. Mutually different types of sheets can be stored in the sheet feeding decks 301 and 302. Of the sheets stored in the sheet feeding decks 301 and 302, an uppermost sheet is separated and fed to the conveyance path 303. The printing apparatus 107 includes, as the exposure unit 227, image forming units 304, 305, 306, and 307 for forming an image. The printing apparatus 107 in this embodiment is configured to form a color image. To that end, the image forming unit 304 is configured to form a black (K) image (toner image). The image forming unit 305 is configured to form a cyan (C) image (toner image). The image forming unit 306 is configured to form a magenta (M) image (toner image). The image forming unit 307 is configured to form a yellow (Y) image (toner image).

The printing apparatus 107 includes, as the image forming unit 228, a secondary transfer roller 309 and an intermediate transfer belt 308 onto which the toner images are to be transferred from the image forming units 304, 305, 306, and 307. The intermediate transfer belt 308 is configured to be rotated clockwise in FIG. 3, and the toner images are superimposed on one another and transferred in the order of the image forming unit 307, the image forming unit 306, the image forming unit 305, and the image forming unit 304. Thus, a full-color toner image is formed on the intermediate transfer belt 308. The intermediate transfer belt 308 is rotated, to thereby carry the toner image to the secondary transfer roller 309. The sheet is conveyed to the secondary transfer roller 309 at a timing at which the toner image is carried to the secondary transfer roller 309. The secondary transfer roller 309 is configured to transfer the toner image on the intermediate transfer belt 308 onto the conveyed sheet.

The printing apparatus 107 includes, as the fixing unit 229, a first fixing device 311 and a second fixing device 313. The first fixing device 311 and the second fixing device 313 have the same configuration, and are each configured to fix the toner image to the sheet. To that end, the first fixing device 311 and the second fixing device 313 each include a pressure roller and a heating roller. The sheet is heated and pressurized by passing between the pressure roller and the heating roller to have the toner image melted and press-fixed. The sheet that has passed through the second fixing device 313 is conveyed to a conveyance path 314. The second fixing device 313 is arranged downstream of the first fixing device 311 in a sheet conveying direction, and is used for adding a gloss to the image on the sheet, which has been subjected to fixing processing by the first fixing device 311, and for ensuring fixability. For that reason, the second fixing device 313 may not be used depending on the type of sheet and the kind of the image forming processing. A conveyance path 312 is provided in order to convey the sheet subjected to the fixing processing by the first fixing device 311 without passing the sheet through the second fixing device 313.

At a position after the conveyance path 314 and the conveyance path 312 merge, a conveyance path 315 and a reverse path 316 are provided. When duplex printing is instructed, the sheet is conveyed to the reverse path 316. The sheet conveyed to the reverse path 316 is reversed in the reverse path 316 in terms of the conveying direction, and conveyed to a double-sided conveyance path 317. A surface (first surface) of the sheet on which an image has been formed is reversed by the reverse path 316 and the double-sided conveyance path 317. The sheet is conveyed to the conveyance path 303 by the double-sided conveyance path 317, and passes through the secondary transfer roller 309 and the fixing unit 229, to thereby have an image formed on a second surface of the sheet different from the first surface.

Figure 4:
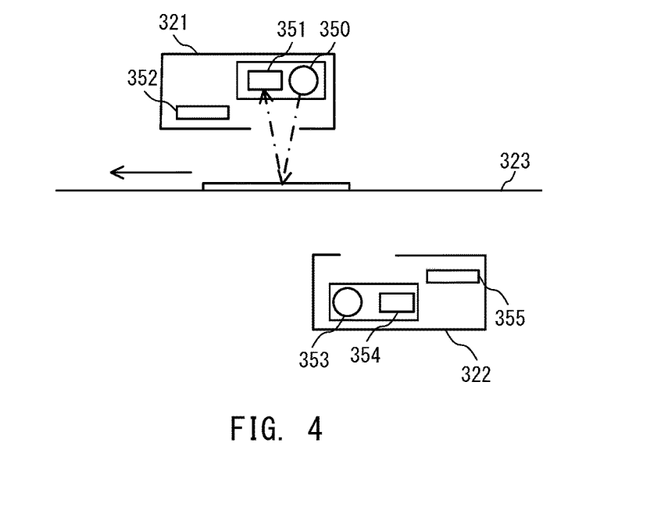
FIG. 4 is an explanatory view of CISs.

In a case of single-sided printing or when images are formed on both sides by duplex printing, the sheet is conveyed to the conveyance path 315. A conveyance path 323 is arranged downstream of the conveyance path 315 in the sheet conveying direction. As the image reading unit 231, contact image sensors (CISs) 321 and 322 are arranged in the conveyance path 323 so as to be opposed to each other across the conveyance path 323. FIG. 4 is an explanatory view of the CISs 321 and 322. The CIS 321 is an optical sensor configured to read an image on an upper surface of the sheet being conveyed along the conveyance path 323. The CIS 322 is an optical sensor configured to read an image on a lower surface of the sheet being conveyed along the conveyance path 323.

The CIS 321 includes a light emitting diode (LED) 350 serving as a light source, a reading sensor 351 serving as a light receiver, and a white reference plate 352. The LED 350 is configured to irradiate the upper surface of the sheet with light at a timing at which the sheet conveyed along the conveyance path 323 reaches a reading position. The reading sensor 351 includes a plurality of light-receiving elements (photoelectric conversion elements) in a direction perpendicular to the sheet conveying direction. Therefore, the direction perpendicular to the sheet conveying direction is a main scanning direction of the CIS 321. The reading sensor 351 is configured to receive the light reflected by the sheet. The plurality of light-receiving elements of the reading sensor 351 each output an output value (electric signal) based on intensity of the reflected light that has been received. Each output value (electric signal) output from the plurality of light-receiving elements is transmitted to the CPU 222. In this manner, an image formed on the sheet is read.

The white reference plate 352 is a calibration member (reference member) used at a time of shading correction of the CIS 321. At the time of the shading correction, the LED 350 and the reading sensor 351 move to a position at which the white reference plate 352 can be read. In another case, at the time of the shading correction, the white reference plate 352 moves to a position at which the LED 350 and the reading sensor 351 perform the reading. The shading correction of the CIS 321 is performed based on a reading result of the white reference plate 352. Therefore, the CIS 321 cannot read an image formed on the sheet at the time of the shading correction.

In the same manner as the CIS 321, the CIS 322 includes an LED 353, a reading sensor 354, and a white reference plate 355. The CIS 322 is configured to operate in the same manner as the CIS 321 to read an image formed on the lower surface of the sheet at a timing at which the sheet conveyed along the conveyance path 323 reaches a reading position. In addition to the CISs 321 and 322, the image reading unit 231 can also be implemented by a CCD or CMOS sensor.

The printing apparatus 107 in this embodiment can form images for adjustment for adjusting the image forming conditions on both sides of the sheet. A sheet having the images for adjustment formed thereon is refer to as "chart for adjustment." The printing apparatus 107 prints the images for adjustment on a sheet to create a chart for adjustment, and causes the CIS 321 and the CIS 322 to read the images for adjustment. The images of the chart for adjustment (reading results), which have been read by the CIS 321 and the CIS 322, are stored in the memory 223. The CPU 222 refers to the memory 223 to analyze the images read by the CIS 321 and the CIS 322, and provide feedback of the analysis result to the image forming conditions to adjust the image forming conditions.

For example, when the in-machine temperature of the printing apparatus 107 rises, the geometric characteristics of the image formed on the sheet vary more greatly than when the in-machine temperature of the printing apparatus 107 is lower. In this case, the geometric characteristics of the image refer to, for example, squareness and a printing position of the image on the sheet. The printing apparatus 107 creates a chart for adjustment, and detects the geometric characteristics based on the reading results obtained by the CISs 321 and 322. The CPU 222 performs correction including affine transformation on the image data so that the detected geometric characteristics become ideal geometric characteristics. The printing apparatus 107 can control the geometric characteristics of the image formed on the sheet by forming an image on the sheet based on the image data corrected by the CPU 222. Thus, the printing apparatus 107 can suppress variations in the geometric characteristics of the image caused by variations in the in-machine temperature.

The image for adjustment to be formed on the chart for adjustment may be not only an image for detecting a geometric characteristic but also an image for detecting an image density or an image for detecting color misregistration. When the image for adjustment for detecting the image density is formed, the CPU 222 generates an image forming condition for suppressing the variations in the image density based on the reading result obtained by the CIS 321 (or the CIS 322). The CPU 222 controls the intensity of the light source of the exposure unit 227 based on the image forming condition, to thereby adjust the image density of the printing apparatus 107 to an ideal image density. In another case, the CPU 222 generates a one-dimensional tone correction table for suppressing the variations in the image density based on the reading result obtained by the CIS 321 (or the CIS 322). The CPU 222 converts the image data based on the tone correction table. The printing apparatus 107 forms an image on the sheet based on the image data converted by the CPU 222. Thus, the image density of the printing apparatus 107 is adjusted to an ideal image density.

Further, when an image for adjustment for detecting the color misregistration is formed, the CPU 222 detects the color misregistration based on the reading result obtained by the CIS 321 (or the CIS 322). The CPU 222 controls, based on the detected color misregistration, a position of an image to be formed on each photoconductor by the exposure unit 227, to thereby correct the color misregistration.

The image for adjustment may be in any one of a format printed as the chart for adjustment on a sheet different from a sheet having a user image printed thereon and a format printed on the same sheet as the sheet having the user image printed thereon. The user image is an image formed in accordance with the print job. When the image for adjustment is to be printed as the chart for adjustment, the CPU 222 creates, from the received image data, image data in which the chart for adjustment is inserted between a user image of the N-th page and a user image of the (N+1)th page each time the number of printed sheets reaches a predetermined number N. When the image for adjustment is to be formed on the same sheet as the sheet having the user image printed thereon, it is preferred that the image for adjustment be formed in a cut-off area of the sheet. This is because the image for adjustment is to be removed from the printed product after cut-off processing is performed. In this case, the user image refers to an image included in the image data transferred from the client PC 103.

When the chart for adjustment is different from a sheet on which a user image is printed, the chart for adjustment is excluded so as to avoid being mixed in the printed products (a bundle of sheets on which user images are printed) corresponding to the print job. To that end, the printing apparatus 107 includes a flapper 324, a discharge path 326, a conveyance sensor 327, and a discharge tray 328. The chart for adjustment having the images (images for adjustment) read by the CISs 321 and 322 is conveyed to the discharge path 326 by the flapper 324. The sheet conveyed to the discharge path 326 is delivered to the discharge tray 328.

When the sheet is not a chart for adjustment, the sheet is conveyed from the conveyance path 323 to a downstream conveyance path 325 by the flapper 324. The sheet conveyed to the downstream conveyance path 325 is passed over to the finisher 109. When the printing apparatus 107 obtains a notification of occurrence of a conveyance jam from the finisher 109, irrespective of whether or not the sheet is a chart for adjustment, the printing apparatus 107 switches the flapper 324 toward the discharge path 326 to deliver all the sheets in the machine (residual sheets) to the discharge tray 328. The discharge of the residual sheets to the discharge tray 328 reduces a load on the user in jam clearance.

The finisher 109 can stack the sheets passed over from the printing apparatus 107. The finisher 109 includes a conveyance path 331 and a stack tray 332 for stacking the sheets. The conveyance path 331 is provided with conveyance sensors 333, 334, 335, and 336. The sheets conveyed from the printing apparatus 107 are stacked on the stack tray 332 through the conveyance path 331. The conveyance sensors 333, 334, 335, and 336 are each configured to detect passage of the sheet being conveyed along the conveyance path 331. When a leading edge or a trailing edge of the sheet in the conveying direction is not detected by the conveyance sensors 333, 334, 335, and 336 even after a lapse of a predetermined time period since start of the conveyance of the sheet, the CPU 242 determines that a conveyance jam (conveyance abnormality) has occurred in the finisher 109. In this case, the CPU 242 notifies the printing apparatus 107 that a conveyance jam has occurred.

<Method of Setting Front-and-Back Auto Adjustment>

The automatic adjustment in this embodiment is described by taking as an example the front-and-back auto adjustment in which the image forming apparatus 101 automatically updates the correction values for the geometric characteristics during printing. FIG. 5A to FIG. 5F are exemplary views of a setting screen for setting the front-and-back auto adjustment. The setting screen is displayed on the display 225 by the CPU 222. The user can set the front-and-back auto adjustment from the setting screen through the operation unit 224. The user sets the front-and-back auto adjustment before instructing execution of printing.

Figure 5A:
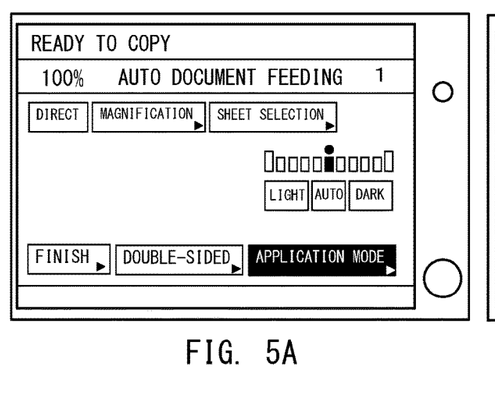
FIG. 5A, FIG. 5B, FIG. 5C, FIG. 5D, FIG. 5E, and FIG. 5F are exemplary views of a setting screen.
Figure 5B:
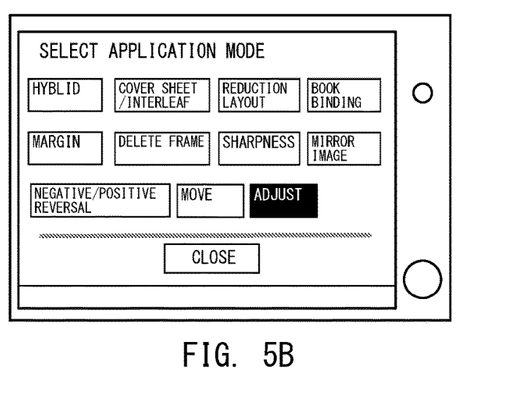
Figure 5C:
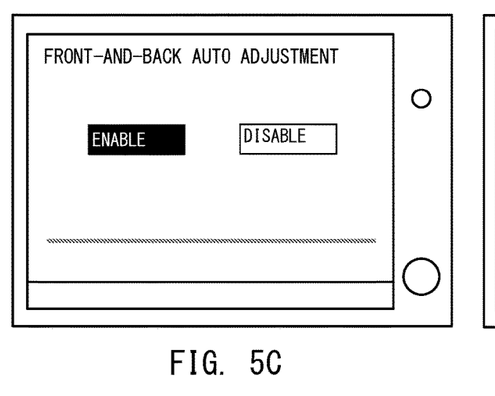

FIG. 5A is an illustration of an initial screen. When the user selects a soft key labeled "ADVANCED MODE" from the initial screen, the CPU 222 displays an advanced mode selection screen of FIG. 5B on the display 225. When the user selects a soft key labeled "ADJUST" from the advanced mode selection screen, the CPU 222 displays a front-and-back auto adjustment setting screen of FIG. 5C on the display 225. When the user selects a soft key labeled "ENABLE" from the front-and-back auto adjustment setting screen, the CPU 222 displays an adjustment frequency selection screen of FIG. 5D on the display 225.

Figure 5D:
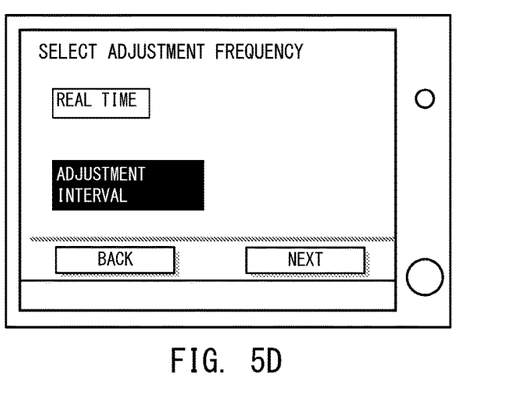
Figure 5E:
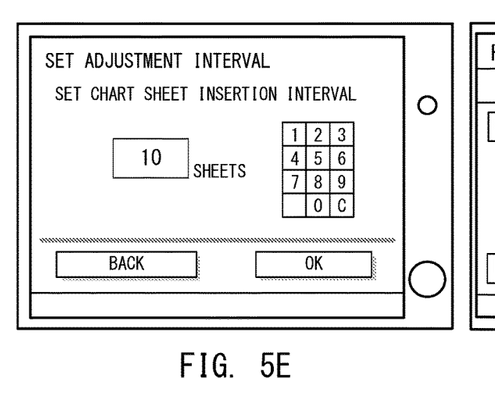

When the user selects a soft key labeled "ADJUSTMENT INTERVAL" from the adjustment frequency selection screen, the CPU 222 displays an adjustment interval setting screen of FIG. 5E on the display 225. When the user presses a soft key labeled "OK" after inputting the number of sheets by a numeric keypad on the adjustment interval setting screen, the front-and-back auto adjustment is enabled. In the example of FIG. 5E, 10 sheets are set as the number of sheets of an adjustment interval. A chart for adjustment is created every number of sheets set as the adjustment interval. That is, the front-and-back auto adjustment is performed by the chart for adjustment every number of sheets set as the adjustment interval, to thereby adjust the image forming conditions (geometric characteristics). When the user selects a soft key labeled "DISABLE" from the front-and-back auto adjustment setting screen, the front-and-back auto adjustment is disabled. Further, when the user selects a soft key labeled "REAL TIME" from the adjustment frequency selection screen, the CPU 222 sets an operation mode for forming the images for adjustment on all pages. In this case, the front-and-back auto adjustment is performed based on the image for adjustment formed on the same sheet as the sheet having the user image printed thereon.

Figure 5F:
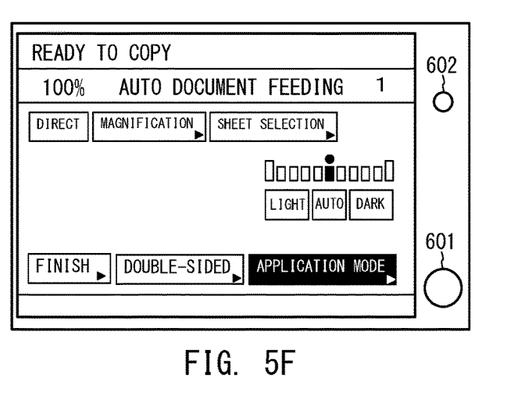

When the front-and-back auto adjustment is set, the CPU 222 displays the initial screen on the display 225. FIG. 5F is an illustration of the display 225 on which the initial screen is displayed, which includes a print button 601 and an interrupt button 602. When the user presses the print button 601, the CPU 222 executes printing. When the front-and-back auto adjustment is enabled, the CPU 222 creates a chart for adjustment every number of sheets set as the adjustment interval. When the front-and-back auto adjustment is disabled, a chart for adjustment is not created, and the front-and-back auto adjustment is not to be performed.

Even in a case of an interrupt print job being interrupt processing, the front-and-back auto adjustment can be set. When the user presses the interrupt button 602 during printing, the interrupt print job is set. After the user presses the interrupt button 602, the user enables the front-and-back auto adjustment, sets the adjustment interval to a predetermined number of sheets (for example, 5 sheets), and presses the print button 601. Thus, a chart for adjustment is created every 5 sheets during printing based on the interrupt print job.

<Information at Time of Execution of Print Job>

Figure 6:
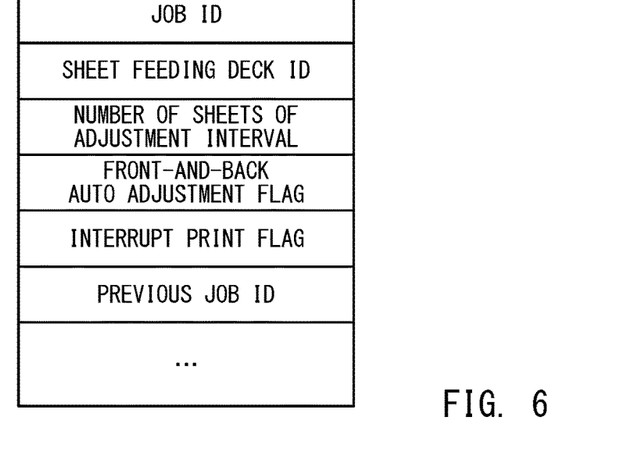
FIG. 6 is an exemplary diagram of job information.

FIG. 6 is an exemplary diagram of job information to be stored in the memory 223 at a time of execution of a print job. The job information is stored in the memory 223 by the CPU 222 in response to input of a print job or an interrupt print job.

The job information is managed by job IDs. The job information includes a sheet feeding deck ID, the number of sheets of the adjustment interval, a front-and-back auto adjustment flag, an interrupt print flag, and the previous job ID. The sheet feeding deck ID indicates a sheet feeding deck to be used for feeding sheets in the print job. The number of sheets of the adjustment interval is the number of sheets set on the adjustment interval setting screen. The front-and-back auto adjustment flag indicates a setting status (enabled or disabled) of the front-and-back auto adjustment. For example, when the front-and-back auto adjustment is enabled, the front-and-back auto adjustment flag is set to "1," and when the front-and-back auto adjustment is disabled, the front-and-back auto adjustment flag is set to "0." The interrupt print flag indicates whether or not the job is an interrupt print job. For example, when the job is an interrupt print job, the interrupt print flag is set to "1," and when the job is not an interrupt print job, the interrupt print flag is set to "0." The previous job ID is, assuming that the job is an interrupt print job, a job ID of a print job executed before being interrupted. The previous job ID is set in the job information by pressing the print button 601.

Figure 7:
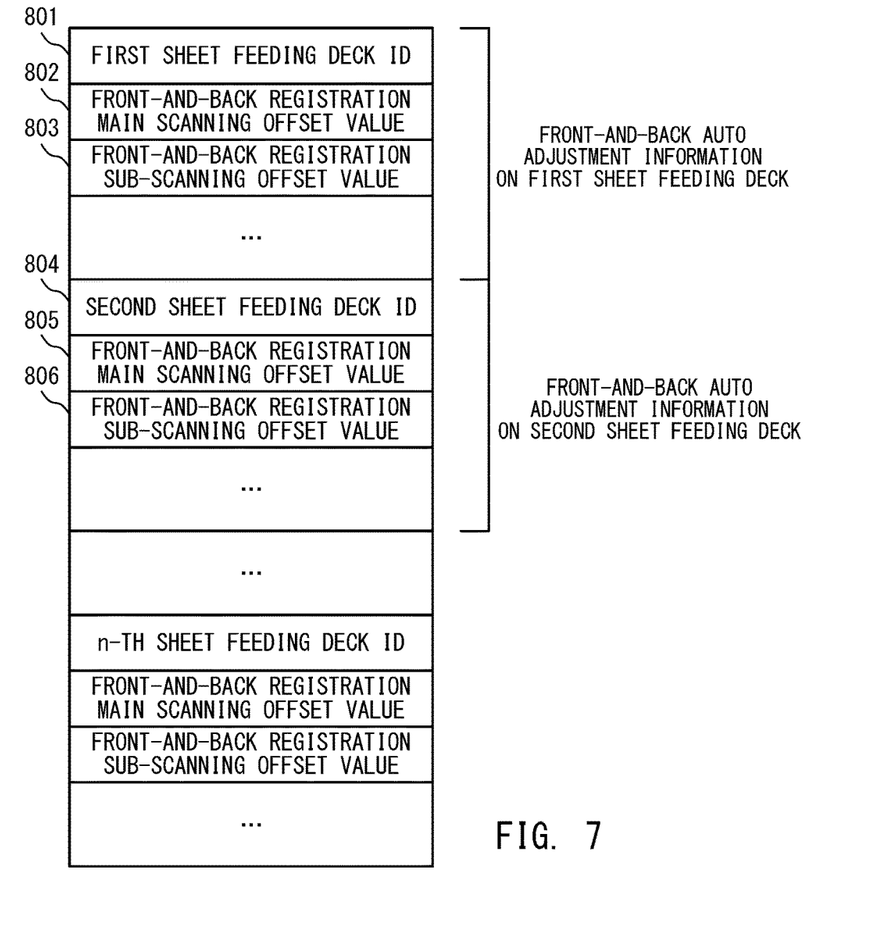
FIG. 7 is an exemplary diagram of front-and-back auto adjustment information.

The image forming conditions (correction values for geometric characteristics) to be adjusted by the front-and-back auto adjustment are set for each sheet feeding deck. The image forming conditions (correction values for geometric characteristics) for each sheet feeding deck are stored in the memory 223 as, for example, front-and-back auto adjustment information. FIG. 7 is an exemplary diagram of the front-and-back auto adjustment information. In this embodiment, a case in which front-and-back registration adjustment (adjustment of geometric characteristics) is performed by the front-and-back auto adjustment is described.

The front-and-back auto adjustment information is identified based on the sheet feeding deck ID as to which sheet feeding deck relates to the front-and-back auto adjustment information. The front-and-back auto adjustment information includes a front-and-back registration adjustment value (correction value) for each sheet feeding deck. The front-and-back registration adjustment value is a value for adjusting (offsetting) a writing start position of each of the images on the front and back sides. In this case, the front-and-back registration adjustment values are a front-and-back registration main scanning offset value 802 and a front-and-back registration sub-scanning offset value 803. For example, in a case of a job in which a sheet is fed from the sheet feeding deck 301 (first sheet feeding deck), the CPU 222 reads out the front-and-back registration main scanning offset value 802 and the front-and-back registration sub-scanning offset value 803 of the first sheet feeding deck ID 801, and offsets the writing start position of the image. For example, the CPU 222 performs affine transformation on the image data included in the print job based on the front-and-back registration main scanning offset value 802 and the front-and-back registration sub-scanning offset value 803, and causes the printing apparatus 107 to form the image based on the converted image data. The front-and-back registration main scanning offset value 802 and the front-and-back registration sub-scanning offset value 803 are updated based on the reading results of the images for adjustment.

<Images for Adjustment>

Figure 8:
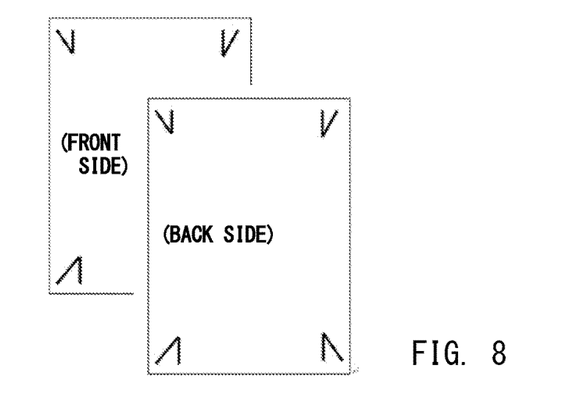
FIG. 8 is an exemplary view of a chart for adjustment.

FIG. 8 is an exemplary view of the chart for adjustment to be used for the front-and-back auto adjustment. When the front-and-back auto adjustment is set enabled, images for adjustment are printed on a sheet to create a chart for adjustment every number of sheets set as the adjustment interval. In the chart for adjustment, the images for adjustment on the front side are read by the CIS 321, and the images for adjustment on the back side are read by the CIS 322. The CPU 222 calculates deviation amounts of the images for adjustment from reference positions based on the reading results of the images for adjustment, which are obtained by the CISs 321 and 322, to determine correction values in the main scanning direction and a sub-scanning direction (front-and-back registration main scanning offset value and front-and-back registration sub-scanning offset value). In this case, the sub-scanning direction is a direction perpendicular to the main scanning direction. In addition, the sub-scanning direction corresponds to a conveying direction for conveying the sheet inside the printing apparatus 107. The CPU 222 updates front-and-back auto adjustment information stored in the memory 223 based on the determined correction values. For example, when a sheet is fed from the sheet feeding deck 301, the CPU 222 updates the front-and-back registration main scanning offset value 802 and the front-and-back registration sub-scanning offset value 803 based on the determined correction values.

The images for adjustment, which are formed together with the user images when "REAL TIME" is selected on the adjustment frequency selection screen, are also the images for adjustment illustrated in FIG. 8. The images for adjustment are formed at the four corners of each user image. In the same manner as the chart for adjustment, the images for adjustment, which are formed together with the user images, are read by the CISs 321 and 322. The correction values are determined based on the obtained reading results.

<Front-and-Back Auto Adjustment>

Figure 9A:
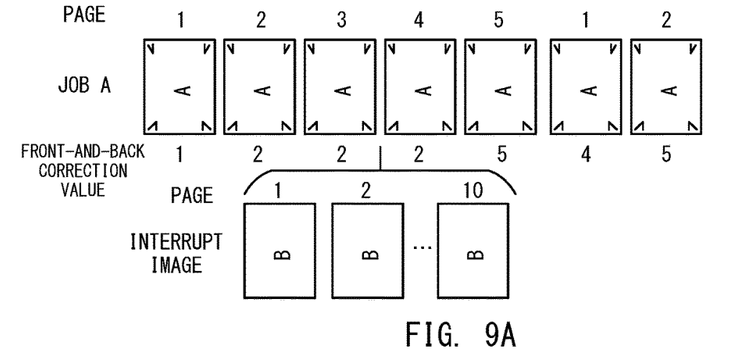
FIG. 9A and FIG. 9B are explanatory views of front-and-back auto adjustment.
Figure 9B:
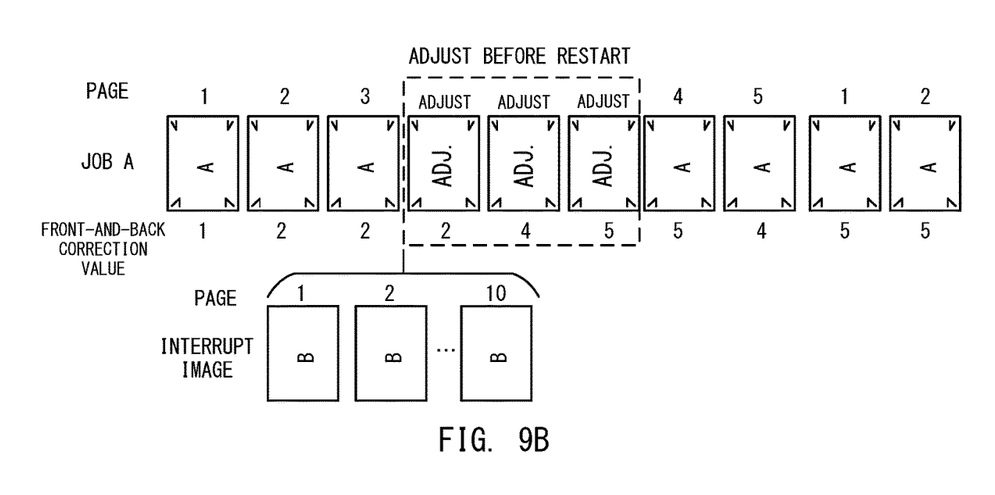

FIG. 9A and FIG. 9B are explanatory views of the front-and-back auto adjustment using the chart for adjustment, which is performed when an interrupt print job (job B) having the front-and-back auto adjustment set disabled is processed by interrupting a print job (job A) having the front-and-back auto adjustment set enabled. The job B is processed by interrupting the job A between the third page and fourth page of the job A. In this case, it is assumed that the front-and-back auto adjustment is set enabled and "REAL TIME" is selected as the adjustment frequency.

As illustrated in FIG. 9A, the front-and-back auto adjustment has been performed up to the third page of the job A, and the front-and-back correction value is updated. Thus, the geometric characteristics of the image to be formed on the sheet are stable. Before the fourth page of the job A is printed, printing based on the job B is processed by interrupting the job A. In this case, the printing corresponding to ten pages is performed based on the job B. It is assumed that, at a time of the printing of the fourth page of the job A, the front-and-back correction value calculated by the processing of the third page is used. However, there is a fear that environmental conditions including the in-machine temperature of the printing apparatus 107 may vary before and after execution of the job B. Therefore, there is a fear that the geometric characteristics (for example, print position) of the image printed on the fourth page of the job A, which is the first page after the job A is restarted after end of the interrupt print job (job B), cannot be controlled within an allowable range. That is, there is a fear that the geometric characteristics of the image to be formed on the sheet may change after the last update of the correction value until printing of the image of the fourth page, and the correction value to be used for the printing of the image of the fourth page may not be an appropriate correction value.

Therefore, in this embodiment, as illustrated in FIG. 9B, after the end of the interrupt print job (job B) having the front-and-back auto adjustment set disabled, the front-and-back auto adjustment is performed through use of charts for adjustment ("ADJ." in FIG. 9B), which are not to be output as printed products. The front-and-back auto adjustment is performed through use of the charts for adjustment before the processing is returned to the interrupted print job (job A), to thereby perform the printing through use of appropriate correction values when the processing of the interrupted print job (job A) is restarted. The number of charts for adjustment may be any number as long as the number is one or more.

Figure 10:
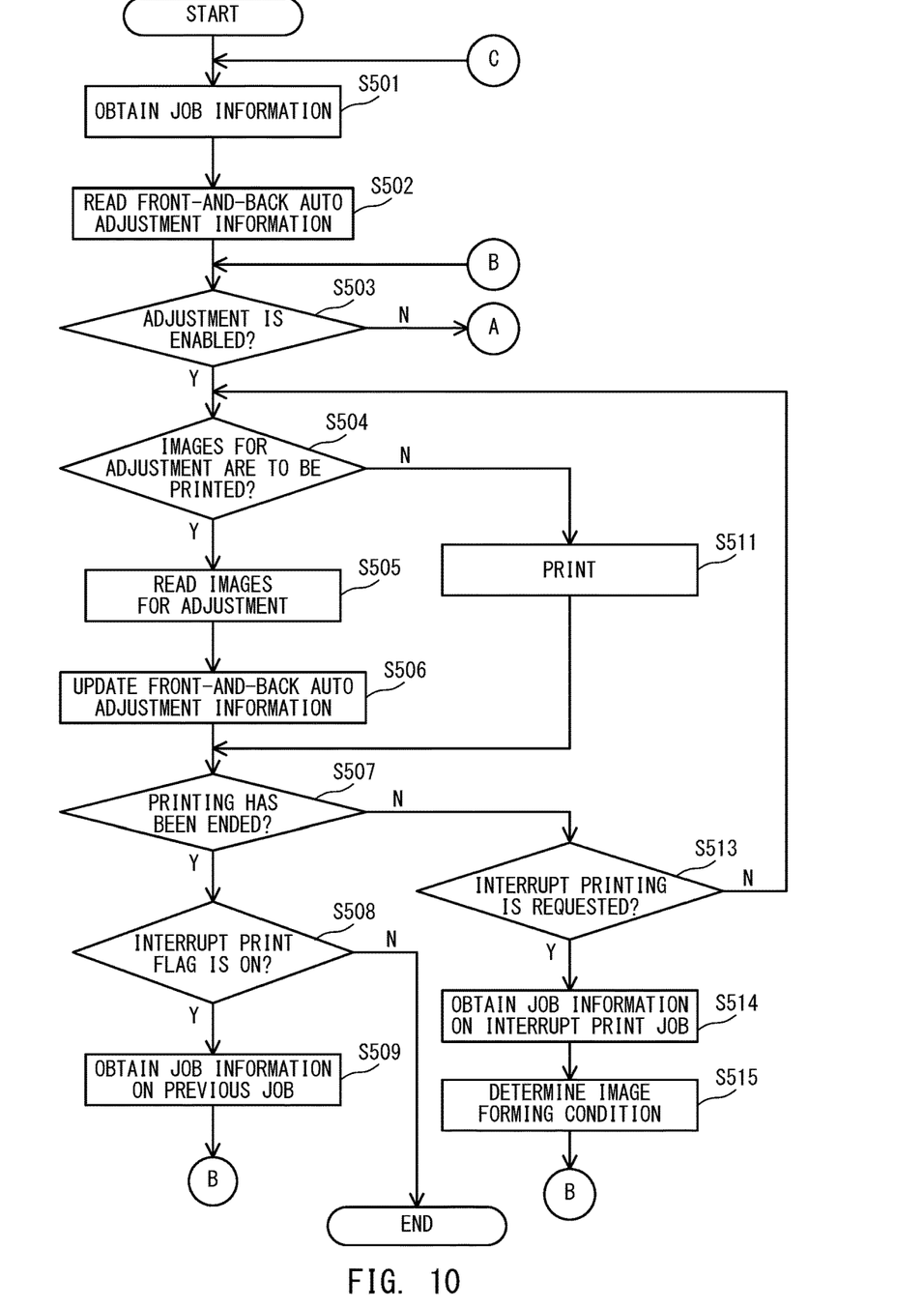
FIG. 10 is a flow chart for illustrating printing processing.
Figure 11:
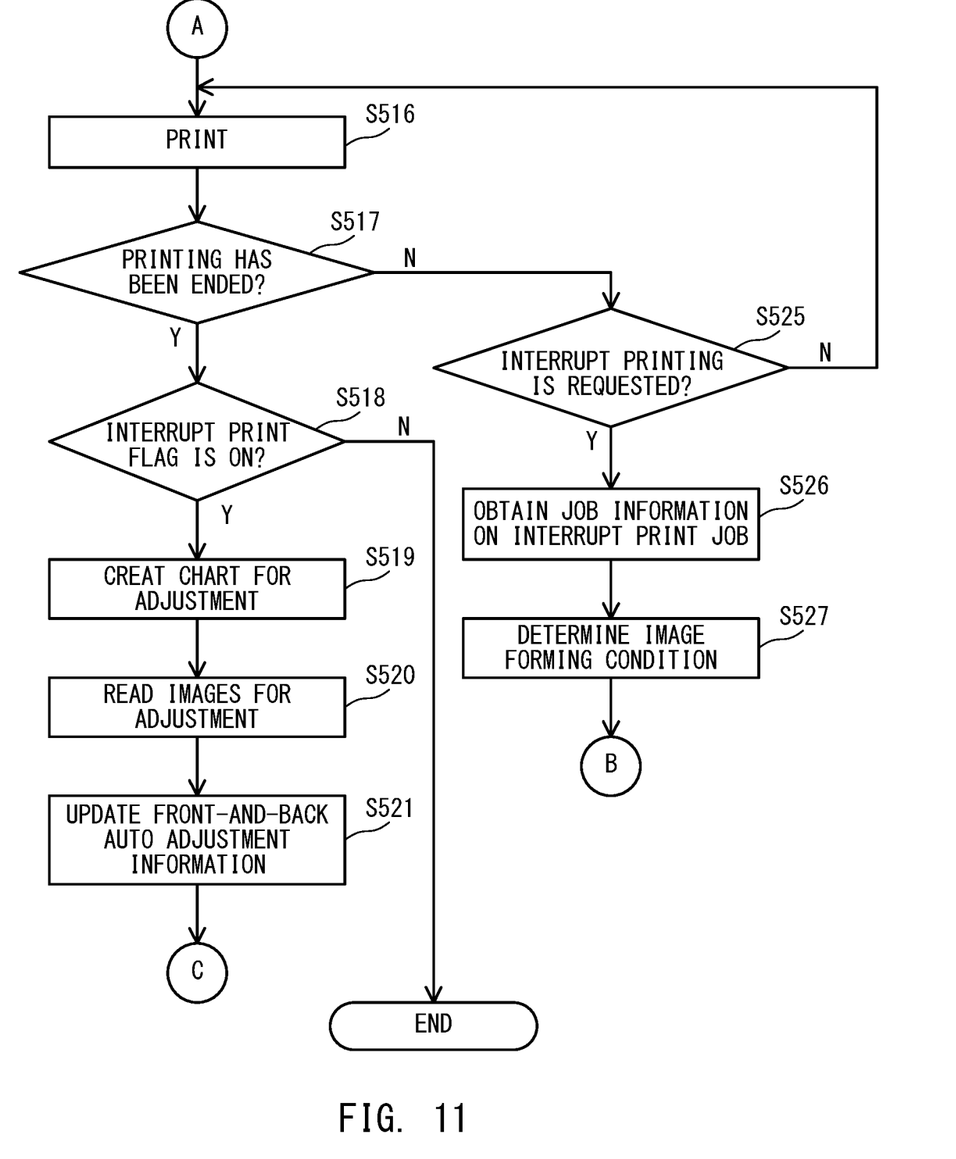
FIG. 11 is a flow chart for illustrating the printing processing.

FIG. 10 and FIG. 11 are flow charts for illustrating printing processing. The processing is started when the printing apparatus 107 receives a print job start instruction from the operation unit 224 or the client PC 103.

When the CPU 222 receives a print job, the CPU 222 first obtains job information on the print job from the memory 223 (Step S501). The CPU 222 refers to the front-and-back auto adjustment information on the sheet feeding deck based on the sheet feeding deck ID included in the obtained job information, and determines the image forming condition (Step S502). The CPU 222 determines based on the obtained job information whether or not the front-and-back auto adjustment is set enabled (Step S503).

When the front-and-back auto adjustment is set enabled (Y in Step S503), the CPU 222 determines whether or not to print the images for adjustment (Step S504). The CPU 222 performs this determination based on whether or not the number of printed sheets has reached the number of sheets of the adjustment interval. When the images for adjustment are to be printed (Y in Step S504), the CPU 222 creates the chart for adjustment, and obtains reading results of the images for adjustment on the chart for adjustment, which are obtained by the image reading unit 231 (Step S505). The CPU 222 updates the front-and-back auto adjustment information set for the sheet feeding deck from which the sheet has been fed, based on the reading results of the images for adjustment (Step S506). When the images for adjustment are not to be printed (N in Step S504), the CPU 222 performs printing processing for the user images corresponding to the print job (Step S511).

After that, the CPU 222 determines whether or not the printing of all the pages instructed by the print job has been ended (Step S507). When the printing of all pages has been ended (Y in Step S507), the CPU 222 determines whether or not the interrupt print flag of the job information is set on (Step S508). When the interrupt print flag is not set on (N in Step S508), the CPU 222 ends the processing.

When the interrupt print flag is set on (Y in Step S508), the print job for which the printing of all pages has been ended is an interrupt print job. In this case, it is required to return the processing to the print job interrupted by the interrupt print job. Therefore, the CPU 222 examines the previous job ID based on the job information, and obtains the job information on the previous print job (Step S509). The CPU 222 returns to the processing of Step S503 to perform the printing processing for the remaining pages of the print job.

When the printing processing has not been ended (N in Step S507), the CPU 222 determines whether or not there is a request for interrupt printing with respect to the subsequent print job (Step S513). When there is a request for the interrupt printing (Y in Step S513), the CPU 222 obtains the job information on the interrupt print job from the memory 223 (Step S514). The CPU 222 refers to the front-and-back auto adjustment information on the sheet feeding deck based on the sheet feeding deck ID included in the obtained job information, and determines the image forming condition (Step S515). The CPU 222 returns to the processing of Step S503 to perform the printing processing based on the interrupt print job. When there is no request for the interrupt printing (N in Step S513), the CPU 222 repeatedly performs the processing of Step S504 and the subsequent steps based on the print job being processed.

When the front-and-back auto adjustment is set disabled (N in Step S503), the CPU 222 performs printing processing for the user images corresponding to the print job (Step S516). After that, the CPU 222 determines whether or not the printing of all the pages instructed by the print job has been ended (Step S517). When the printing of all pages has been ended (Y in Step S517), the CPU 222 determines whether or not the interrupt print flag of the job information is set on (Step S518). When the interrupt print flag is not set on (N in Step S518), the CPU 222 ends the processing.

When the interrupt print flag is set on (Y in Step S518), the print job for which the printing of all pages has been ended is an interrupt print job. In this case, it is required to return the processing to the print job interrupted by the interrupt print job. In this case, the interrupt print job has the front-and-back auto adjustment set disabled, and hence the CPU 222 is required to perform the front-and-back auto adjustment to adjust the geometric characteristics. Therefore, the CPU 222 creates a chart for adjustment (Step S519). The CPU 222 obtains reading results of the images for adjustment on the chart for adjustment, which are obtained by the image reading unit 231 (Step S520). The CPU 222 updates the front-and-back auto adjustment information set for the sheet feeding deck, based on reading results of the images for adjustment (Step S521). The sheet feeding deck for which the front-and-back auto adjustment information is to be updated is a sheet feeding deck being used for feeding sheets in a print job for which the processing has been interrupted by the interrupt print job.

After the front-and-back auto adjustment information is updated in the processing of Step S521, the CPU 222 returns to the processing of Step S501 to perform the printing processing for the remaining pages of the print job interrupted by the interrupt print job.

When the printing processing has not been ended (N in Step S517), the CPU 222 determines whether or not there is a request for interrupt printing with respect to the subsequent print job (Step S525). When there is a request for the interrupt printing (Y in Step S525), the CPU 222 obtains the job information on the interrupt print job from the memory 223 (Step S526). The CPU 222 refers to the front-and-back auto adjustment information on the sheet feeding deck based on the sheet feeding deck ID included in the obtained job information, and determines the image forming condition (Step S527). The CPU 222 returns to the processing of Step S503 to perform the printing processing based on the interrupt print job. When there is no request for the interrupt printing (N in Step S525), the CPU 222 repeatedly performs the processing of Step S516 and the subsequent steps based on the print job being processed.

In this manner, even when there is an interrupt print job for which the front-and-back auto adjustment is not set, the front-and-back auto adjustment based on the chart for adjustment is performed before the interrupted print job is restarted. Therefore, even when there has occurred a deviation or another image forming condition change in the geometric characteristics during the interrupt processing, it is possible to constantly perform printing under appropriate image forming conditions without exerting an influence on the printed product. As described above, according to the embodiment of the present disclosure, quality of the image to be formed on the sheet can be stabilized even when the interrupt print job is executed. The automatic adjustment in this embodiment has been described by taking as an example the front-and-back auto adjustment for correcting the geometric characteristics of the image to be formed on the sheet, but the same processing may be performed by replacing the automatic adjustment with other automatic control for automatically adjusting another image forming condition.

<Modification Example>

When the number of sheets to be printed based on the interrupt print job is less than a predetermined number of sheets (for example, three sheets), a change in the environmental conditions is small between before and after the execution of the interrupt print job. In this case, the image forming conditions may be adjusted through use of the charts for adjustment, but the charts for adjustment become waste sheets, with the result that resources are wasted. Therefore, when the number of sheets to be printed based on the interrupt print job is less than the predetermined number of sheets, the image forming conditions used immediately before the interrupt print job may be used as they are without performing the automatic adjustment when the processing is returned. This is because an influence to be exerted on the image quality is small even when the image forming conditions used immediately before the interrupt print job are used as they are. That is, when the number of sheets to be printed based on the interrupt print job is less than the predetermined number of sheets, the printing apparatus 107 returns to the original print job without adjusting the image forming conditions. When the number of sheets to be printed based on the interrupt print job is more than the predetermined number of sheets, the printing apparatus 107 adjusts the image forming conditions, and returns to the original print job. This eliminates the requirement for the charts for adjustment, to thereby be able to reduce the waste sheets.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-115788 filed Jul. 3, 2020, which is hereby incorporated by reference herein in its entirety.

What is claimed is:

1. An image forming apparatus, comprising:
a printing apparatus configured to form an image on a sheet based on an image forming condition;
an image sensor configured to read an image for adjustment of the image forming condition, which is formed on the sheet by the printing apparatus; and
at least one processor configured to:
control the printing apparatus to form an image based on a print job; and
control, when an interrupt print job to be processed by interrupting image formation based on the print job is requested, the printing apparatus to form an image corresponding to the interrupt print job by interrupting processing based on the print job,
wherein the at least one processor is configured to:
control the printing apparatus to create a first predetermined number of charts for adjustment obtained by forming the image for adjustment on the sheet before the processing is returned to the print job after end of processing based on the interrupt print job; and
adjust the image forming condition based on a result of reading the image for adjustment of the first predetermined number of charts for adjustment by the image sensor before the processing is returned to the print job.

2. The image forming apparatus according to claim 1, wherein the at least one processor is configured to adjust the image forming condition based on the result of reading the image for adjustment of the chart for adjustment before the processing is returned to the print job after the end of the processing based on the interrupt print job having the adjustment of the image forming condition set disabled.

3. The image forming apparatus according to claim 2, wherein the print job has the adjustment of the image forming condition set enabled.

4. The image forming apparatus according to claim 1, wherein the at least one processor is configured to avoid performing the adjustment of the image forming condition based on the result of reading the image for adjustment of the chart for adjustment, when the number of sheets on which images are to be formed based on the interrupt print job is less than a second predetermined number of sheets.

5. The image forming apparatus according to claim 1, wherein the at least one processor is configured to adjust the image forming condition based on the result of reading the image for adjustment of the chart for adjustment at a predetermined adjustment interval, when the print job has the adjustment of the image forming condition set enabled.

6. The image forming apparatus according to claim 1, wherein the at least one processor is configured to adjust the image forming condition based on a result of reading the image for adjustment by the image sensor from a printed product obtained by forming the image for adjustment together with the image corresponding to the print job on the sheet, when the print job has the adjustment of the image forming condition set enabled.

7. The image forming apparatus according to claim 1, wherein the at least one processor is configured to correct a geometric characteristic of the image to be formed on the sheet through the adjustment of the image forming condition.

8. An image forming apparatus, comprising:
a printer configured to print an image on a sheet based on a printing condition, and convey the sheet in a conveyance path;
an image sensor provided in the conveyance path and configured to read a test image on a sheet while the sheet having the test image is conveyed, the test image being printed by the printer; and
a controller configured to:
generate, in a case where a first print job in which a first image and the test image are printed is executed, the printing condition based on a reading result of the test image by the image sensor;
control, in a case where a second print job in which a second image is printed without printing the test image is executed by interrupting an execution of the first print job, the printer to print another test image on another sheet between the end of an execution of the second print job and a resumption of the execution of the first print job; and
generate the printing condition based on a reading result of the another test image by the image sensor before the resumption of the execution of the first print job.

9. The image forming apparatus according to claim 8, wherein
the controller is configured to control the printer to resume the execution the first print job without printing the another test image, in a case where a number of sheets on which a plurality of the second image is to be formed based on the second print job is less than a predetermined threshold.

10. The image forming apparatus according to claim 8, wherein
the controller controls the printer to print the first image and the test image on a same sheet.

11. The image forming apparatus according to claim 8, wherein
the controller controls the printer to print the test image every time a number of sheets on which the first image is printed reaches a predetermined number in the first print job.

12. The image forming apparatus according to claim 8, wherein
the printing condition is a condition for adjusting a print position of an image to be printed on the printer.

13. The image forming apparatus according to claim 8, wherein
the printing condition is a condition for adjusting an inclination of an image to be printed on the printer.

14. The image forming apparatus according to claim 8, wherein
the printing condition is a condition for adjusting an image density of an image to be printed on the printer.

15. The image forming apparatus according to claim 8, wherein
the test image is printed in a cut-off area of the sheet.

* * * * *